United States Patent [19]

Golovchenko et al.

[11] 4,365,156

[45] Dec. 21, 1982

[54] TUNABLE $\theta-2\theta$ DEVICE

[75] Inventors: Jene A. Golovchenko, Basking Ridge; Richard A. Levesque, High Bridge, both of N.J.

[73] Assignee: Bell Telephone Laboratories, Incorporated, Murray Hill, N.J.

[21] Appl. No.: 220,010

[22] Filed: Dec. 23, 1980

[51] Int. Cl.[3] .......................... G01N 23/20; G01J 3/12; G01J 3/18

[52] U.S. Cl. .......................................... 378/84; 356/333; 356/334; 378/44

[58] Field of Search ............ 250/276, 277 R, 277 CH, 250/278; 356/333, 332, 334

[56] References Cited

U.S. PATENT DOCUMENTS 2,305,776 12/1942 Hansen .

3,914,605 10/1975 Hara .................................... 250/276

4,028,547 6/1977 Eisenberger ......................... 250/272

FOREIGN PATENT DOCUMENTS 522458 11/1976 U.S.S.R. .

OTHER PUBLICATIONS

Finkelstein, N. A., "An Efficient Grating Mount" J.O.S.A., vol. 41, No. 3, Mar. 1951, pp. 179-182.

Hart, M., "X-ray Polarization Phenomena," *Phil. Mag.* B., 1978, vol. 38, No. 1, pp. 41-56.

Hastings, J. B., et al., "A Separated Function Focusing Monochrometer System for Synchrotron Radiation," *Nuclear Instr. and Meth.*, vol. 152, 1978, pp. 167-171.

Koval'chuk et al., "A Two-Crystal X-ray Spectrometer with Congruent Rotation Axes," translated from *Pribory i Tekhnika Eksperimenta*, vol. 18, part 2, No. 4, pp. 203-205, Jul.-Aug. 1975.

Lipsett, F. R., et al., "Varioilluminator (Subtractive Double Monochromator with Variable Bandpass)," *Applied Optics*, vol. 12, No. 4, Apr. 1973, pp. 818-821.

*Primary Examiner*—Alfred E. Smith

*Assistant Examiner*—T. N. Grigsby

*Attorney, Agent, or Firm*—Peter V. D. Wilde; James H. Fox

[57] ABSTRACT

A tunable monochromator selects a narrow range of wavelengths from a broadband source of radiation, such as a synchrotron X-ray source, visible light, etc. Wavelength selectivity is obtained by Bragg reflection from crystal surfaces or by diffraction gradings, prisms, etc. The inventive apparatus maintains proper orientation of two rotary members, at least one of which is typically a wavelength selective member. The apparatus allows the angles of incidence and reflection to be changed, thus changing the wavelength selected without changing the output angle or height. Two wavelength selective members can be used, or a detector probe may be positioned relative to a single wavelength selective member, or a desired polarization can be obtained with the use of a single wavelength selective member and a quarter wavelength plate. Other devices employing the $\theta-2\theta$ principle, including variable delay lines, can be realized with the device.

11 Claims, 9 Drawing Figures

TUNABLE $\theta-2\theta$ DEVICE

1. FIELD OF THE INVENTION

This invention relates to monochromators, variable polarizers, wavelength selective analyzers, variable delay lines, and other tunable $\theta-2\theta$ devices, including dual crystal X-ray monochromators for use with synchrotron radiation.

2. DESCRIPTION OF THE PRIOR ART

Monochromators are devices for selecting a narrow range of wavelengths from a radiation source comprising a larger number of wavelengths. Frequently, the wavelength selected is a function of the angle of incidence of the radiation onto a wavelength selective member. For example, for an X-ray monochromator, one or more crystals exhibiting the Bragg effect are typically utilized to obtain wavelength selectivity. In a dual crystal X-ray monochromator, the incoming broadband X-ray beam intercepts a first crystal and is reflected onto a second crystal. To change the wavelength selected, the first crystal is rotated from its initial position by an angle $\theta$. In order for the reflected beam to intercept the second crystal at the same point, the position of the second crystal must be rotated by an angle $2\theta$ around the first crystal. Hence, dual crystal monochromators of this type are called "$\theta-2\theta$" devices, and form a well-known class of instruments used in the X-ray field and the optical field, for monochromators and other instruments. While monochromators and other $\theta-2\theta$ devices may be employed for a wide range of electromagnetic radiation, in recent years a great deal of interest has developed in the use of synchrotron X-ray radiation from high energy electron storage rings for various physical investigations and production uses.

X-ray monochromators covering the energy range from a few kilovolts and up (i.e., wavelengths of less than a few Angstroms) generally use crystals of silicon or germanium as energy dispersive elements. The actual energy bandpass of such a crystal is usually determined by combining Bragg's law of crystal reflection with the angular divergence of the beam emerging from the synchrotron. After the preliminary Bragg reflection, which selects a range of wavelengths from the incoming radiation beam, the reflected ray may then be directed onto a second Bragg reflecting crystal surface for a further selection of wavelengths, and redirection of the beam parallel to its original direction. However, the first and second crystal are constrained to be highly parallel when Bragg angle reflection is used with X-ray radiation source. The constraints on the parallelism are determined by the angular emittance and acceptance of the crystals used. Values of the order of 1 to 20 arc-seconds are typical.

To meet this constraint of parallelism, the first and second crystals may actually be part of the same crystals wherein a groove is milled in a piece of silicon with one side of the groove serving as the first crystal and the other as the second. The planes of these crystals are parallel by virtue of the uncut crystalline material connecting them. However, it is desirable in many cases to use two separate crystals for obtaining the dual Bragg reflection. This allows the second crystal to be adjusted slightly, relative to the first for harmonic rejection, or to eliminate detuning due to first crystal thermal loading, which is typically a problem with high power synchrotron X-ray sources. In addition, the use of two parallel crystals allows the direction of the output beam to remain constant, and in addition obtain a constant beam offset, as compared to the input beam as the angles are varied, and hence as the wavelength selected is varied. This is desirable, for example, to allow a device that analyzes the output beam to remain stationary as the wavelength is varied.

Tunable dual crystal monochromators in the past have typically been constructed using very elaborate mechanical linkages or by the use of separate electrically controlled crystal elements requiring elaborate position-determining devices and computer-controlled actuating devices in order to maintain the parallel relationship between the crystal elements as their position is varied when selecting different wavelengths. It is desirable to have an improved and simplified $\theta-2\theta$ device capable of maintaining a constant output beam offset and direction relative to the input beam as the device is tuned.

SUMMARY OF THE INVENTION

We have invented a device suitable for maintaining a fixed angular relationship between the surfaces of two members. At least one of the members is typically a wavelength selective member. The proper spacing of these members is maintained to ensure that the radiation reflected, refracted, diffracted, or otherwise directed from the first member intercepts the second member at approximately the same point, no matter what the angle of incidence. This is accomplished by mounting the first member on a first rotary member, and the second member on a second rotary member. The two rotary members are connected by first and second linear sliding members, respectively, to a third rotary member. The included angle between the two linear sliding members is a right angle. One of the rotary members pivots about a fixable pivot point. The other two rotary members pivot about pivot points which are capable of motion along two parallel linear axes. The fixable pivot point is located so that an axis drawn through it parallel to the two linear axes forms, with the two linear axes, three equally spaced axes.

DETAILED DESCRIPTION

Figure 1:
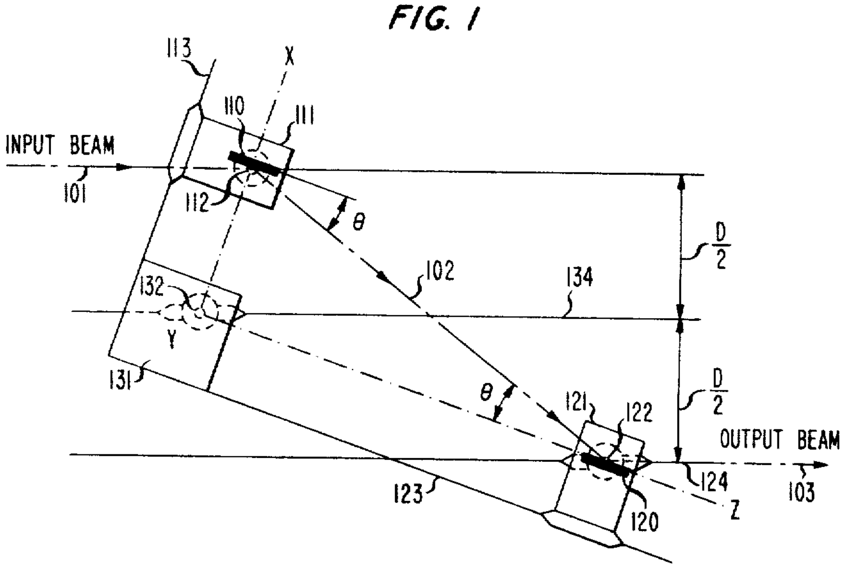
FIG. 1 shows a dual crystal monochromator suitable for use with an X-ray source.

The following detailed description describes a device for maintaining a fixed angular relationship between two members, providing, for example, a capability of tuning a selected wavelength. As shown in FIG. 1, an incident X-ray beam 101 is reflected off the first crystal, with an angle of incidence and reflection of $\theta$ onto the second crystal, wherein it is again reflected at an angle of incidence and reflection of $\theta$ to form an output beam which is parallel to the input beam. In this embodiment, the first crystal 110 is mounted on rotary member 111, which is capable of pivoting about a fixable pivot point 112, whereas the second crystal 120 is mounted on rotary member 121, which is capable of rotation about a pivot point 122 that is capable of moving along linear axis 124. In order to maintain the surfaces of these crystals parallel while assuring that the reflected beam 102 intercepts the second crystal at the same point regardless of the angles of incidence and reflection, the two rotary members are connected to a third rotary member 131 by linear sliding members 113 and 123. These linear sliding members are maintained at right angles to one another. As shown in FIG. 1, linear members 113 and 123 are fixed to rotary member 131, and are capable of sliding through a portion of rotary members 111 and 121, respectively. However, one or both of these linear members could be fixed to rotary member 111 or 121 and slide through rotary member 131. In addition, the sliding linear members 113 and 123 are shown offset from the pivot points 112, 122, and 132. However, one or both of the linear members could pass through the respective pivot points, although it is typically more mechanically feasible to have them offset as shown. Also in FIG. 1, the pivot point 132 about which rotary member 131 is capable of rotation is capable of motion along linear axis 134. This linear axis is parallel to linear axis 124.

By varying the position of the third rotary member 131 along linear axis 134, a change in the position of the second rotary member 121 along linear axis 124 is obtained, along with a change of the angle of incidence and reflection $\theta$ from the crystals mounted on the first and second rotary members. When linear axis 134 is located midway between fixable pivot point 112 and linear axis 124, and when linear sliding members 113 and 123 form a right angle as noted above, then the following occurs: (1) the surfaces of crystals 110 and 120 are maintained parallel as the angle $\theta$ is changed; (2) the reflected beam 102 intercepts the crystal 120 at substantially the same spot on the crystal, regardless of the position of the second rotary member 121 along axis 124. A change in position of the rotary members is shown schematically in FIG. 2 for the embodiment of FIG. 1, with the reflecting surfaces not shown.

The "fixable" pivot point noted above, and in the following embodiments, may be a fixed pivot point. However, it may alternately be moved along an axis parallel to the above-noted parallel linear axes. This allows, for example, for the range of angles of incidence to be tuned over a greater range for a given length of the parallel linear axes. Typically, a series of holes may be provided along the above axis for semi-permanent mounting of the fixable pivot point. The term "fixable" thus indicates this pivot point may be fixed, while still allowing the device to be tuned, but does not require it.

Figure 2:
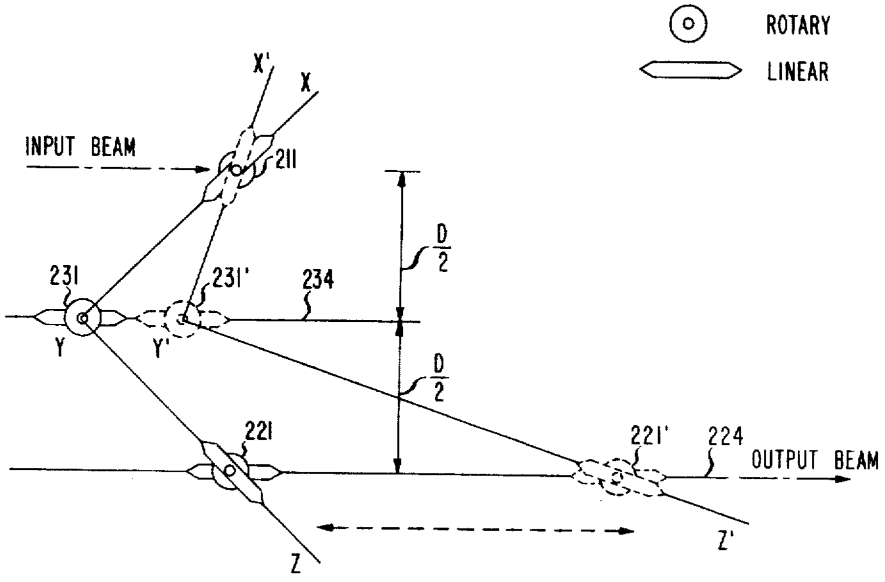
FIGS. 2, 3, and 4 show schematically three embodiments of the basic geometry of the tunable device.
Figure 3:
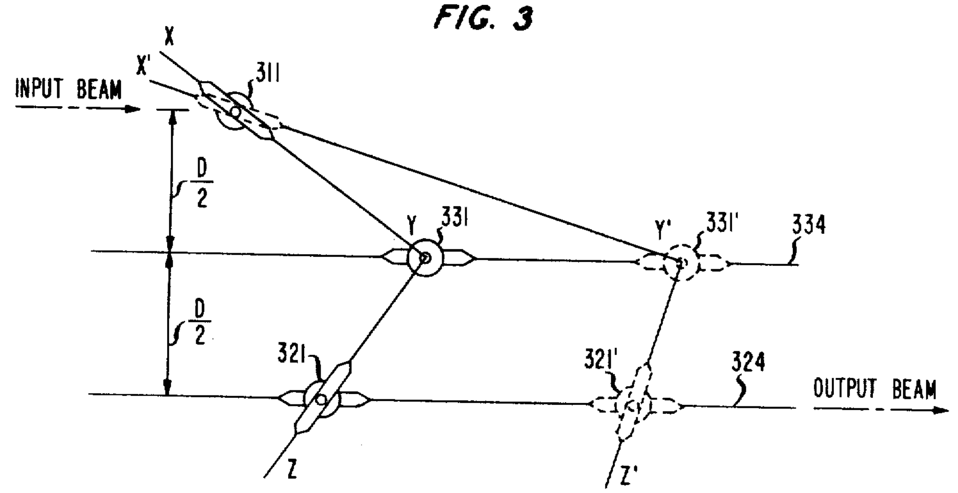
Figure 4:
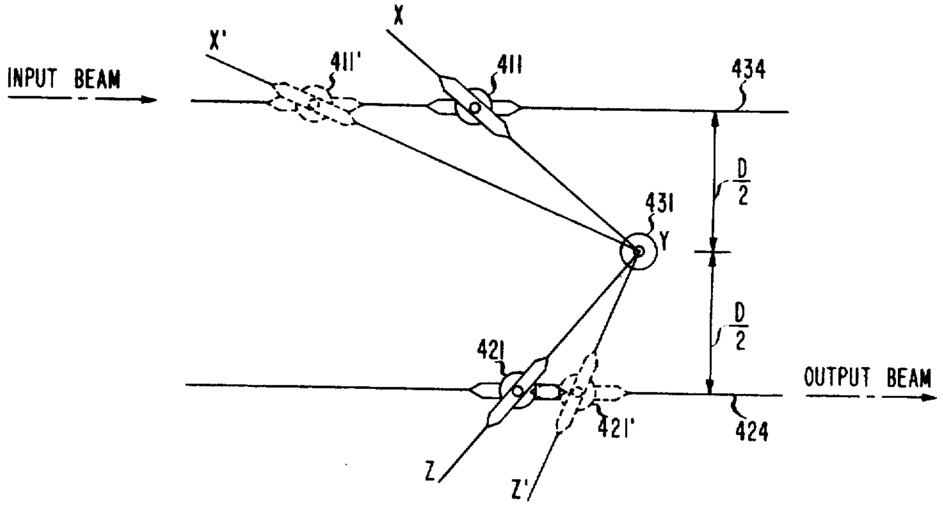

A second embodiment of this device is shown schematically in FIG. 3. It can be seen that this embodiment is very similar to the embodiment of FIG. 2, except that the right angle intersection of the linear sliding members is placed on the opposite side of the first rotary member. It can be seen, by comparing FIGS. 2 and 3, that for a given displacement of the second rotary member (221, 321) along its linear axis (224, 324), the embodiment of FIG. 2 allows for a shorter displacement of the third linear member (231, 331) along its linear axis (234, 334). Therefore, FIG. 2 is the presently preferred embodiment, although the embodiment of FIG. 3 is useful, for example, when a greater degree of leverage from the third rotary member is desirable for accomplishing the changes in position. A third embodiment is shown schematically in FIG. 4, wherein the first rotary member 411 is capable of motion along linear axis 434, which is parallel to the linear axis 424 along which the second rotary member 421 is capable of moving. In this embodiment, it is the third rotary member 431 that is attached to the fixable pivot point. A final embodiment (not shown) is analogous to FIG. 4, except that the third rotary member is to the left of the first rotary member, by analogy to FIG. 2. In these latter two embodiments, the position of the third rotary member is equidistant between the two linear axes to obtain the operation outlined above. For all the embodiments, this latter condition is described by noting that an axis drawn through the fixable pivot point parallel to the other two parallel axes forms three equally spaced axes. The spacing between these axes is denoted D/2 in FIGS. 1–4.

In addition to maintaining the crystal surfaces parallel, it is also possible to maintain the crystal surfaces, or orientation of other wavelength selective members, in other relationships. For example, if the second reflective surface is at right angles to the first reflective surface, then the output beam will be reflected back in the same direction of the input beam; that is, output beam 103 will be antiparallel to input beam 101, rather than exiting parallel to the input beam. When the output beam is parallel or antiparallel to the input beam, the offset between the input and output beams is constant, being the distance D indicated in FIGS. 1–4. Other fixed angular relationships of other wavelength selective members can also be obtained. However, if the output beam exits in a direction other than parallel or antiparallel to the input beam, the position of the output beam changes as the device is tuned. As noted above, a constant offset as the device is tuned is often desirable when analyzing the output beam, or when irradiating an article of manufacture, or for other purposes.

Rather than positioning two wavelength selective members, the inventive device may be used with only one wavelength selective member, while using the second rotary member to position another type of member. For example, it has been determined that X-rays may be polarized by the use of a quarter wavelength plate; see "X-Ray Polarization Phenomena", M. Hart, *Philosophical Magazine* B, Vol. 38, pages 41–56, 1978. Therefore, by locating a Bragg reflective surface at the first rotary member to obtain wavelength selectivity and by locating a polarizing plate at the second rotary member, it can be seen that an X-ray polarizing device is obtained.

In another utilization of the inventive apparatus, an instrumentation probe may be located at the second rotary member, positioned so as to intercept the reflected radiation. For still another use, an article of manufacture that is to be irradiated may be located at the second rotary member. For example, it is known to use Bragg reflected X-rays for photolithography of microcircuits; see U.S. Pat. No. 4,028,547. It should be noted that any of the geometrical embodiments shown in FIGS. 2 through 4 above may be used for any of the abovedescribed devices, or for other devices where maintaining a fixed angular relationship between a wavelength selective member and another member is desired.

The above geometry can be realized in a simple mechanical embodiment. When the operation of the device is noncritical, as when the wavelength selective members are prisms or gratings used in an optical monochromator for educational purposes, the linear sliding members and the axes along which the pivot points move may be realized using simple mechanical sliding components. However, when the device is to be used as an X-ray monochromator, a more careful mechanical construction is required. In particular, it has been determined that the use of air bearings is highly desirable for the various mechanical elements.

Figure 5:
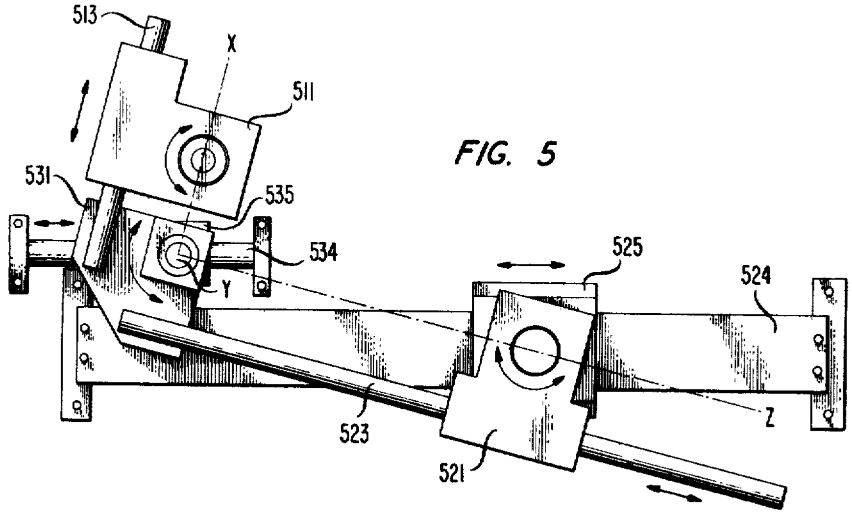
FIG. 5 shows a first mechanical arrangement for realizing the tunable device.

FIG. 5 indicates one mechanical embodiment of the device. The first rotary member 511 comprises associated linear bearings, shown dotted, which provide the capability of the sliding linear member 513 to slide through the rotary member. This first rotary member comprises an air thrust bearing and pillow block assembly. This air bearing assembly consists of a stationary three-fourths inch central steel rod serving as an axle for the surrounding air bushing (Dover LB-7) and pillow block enclosure which together are free to rotate, as shown by the arrow. Motion perpendicular to the plane of FIG. 5 is constrained by endcaps also working on the air-bearing principle, which results in this element actually being an air thrust bearing.

The second rotary member 521 also comprises a linear bearing (Dover LB-7) through which the second linear sliding member 523 is free to travel. This second rotary member further comprises a rotary thrust air bearing assembly (Dover 250). In addition, a large linear air bearng 525 (Dover 400B) translates this assembly along the horizontal axis shown. The linear air bearing is supported by a 24-inch long, $2\frac{1}{2}$ by $1\frac{1}{4}$ inch ground rectangular shaft 524 on which the air bearing slides, as indicated by the horizontal arrows on the rectangular shaft. The energy selected from the synchrotron or other radiation beam is determined ultimately by the horizontal position of this bearing. Energy control may be obtained through a leadscrew drive assembly (not shown) which positions bearing 525 along shaft 524.

The third rotary member comprises another three-fourths inch axle, whose axis lies perpendicular to the plane of FIG. 5, but in contrast to the similar piece for the first rotary member, it is here mounted on the pillow block containing another air bushing that is free to translate horizontally on another steel rod. This steel rod is parallel to the ground rectangular shaft along which the second rotary member is capable of moving. Thus, these two shafts provide for motion along parallel axes for the second and third rotary members.

Figure 6:
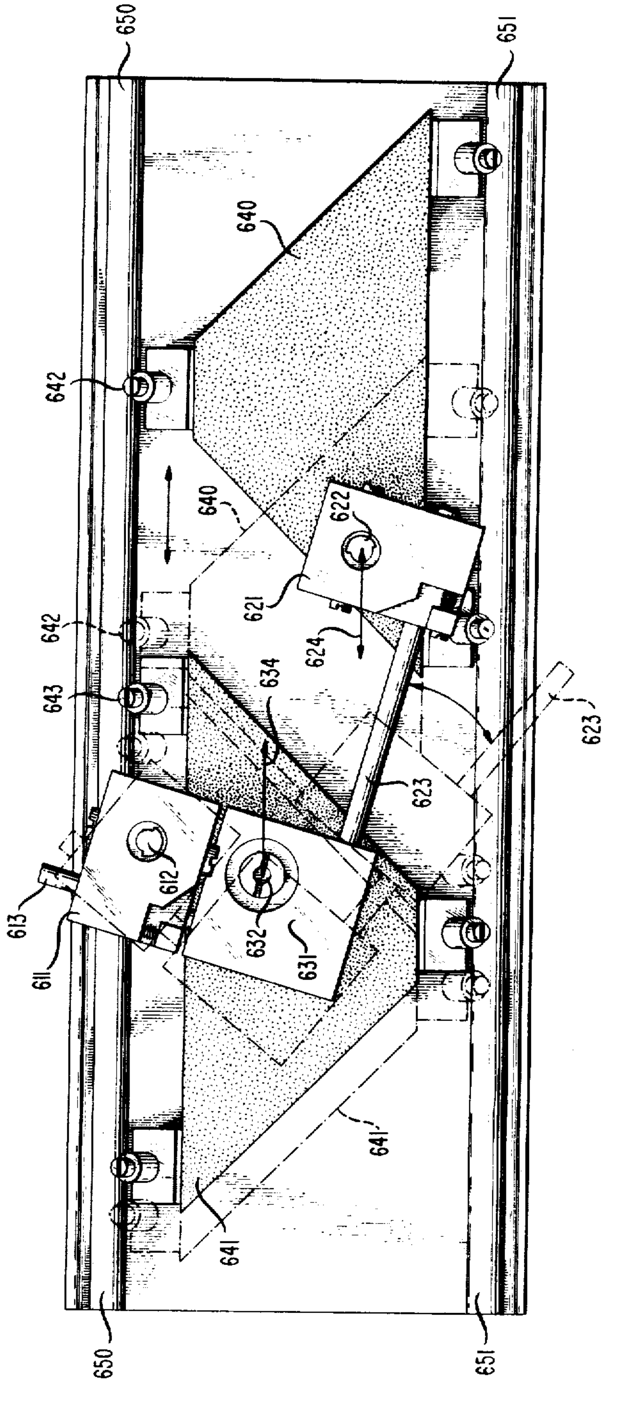
FIGS. 6 and 7 show a second mechanical arrangement for realizing the tunable device.
Figure 7:
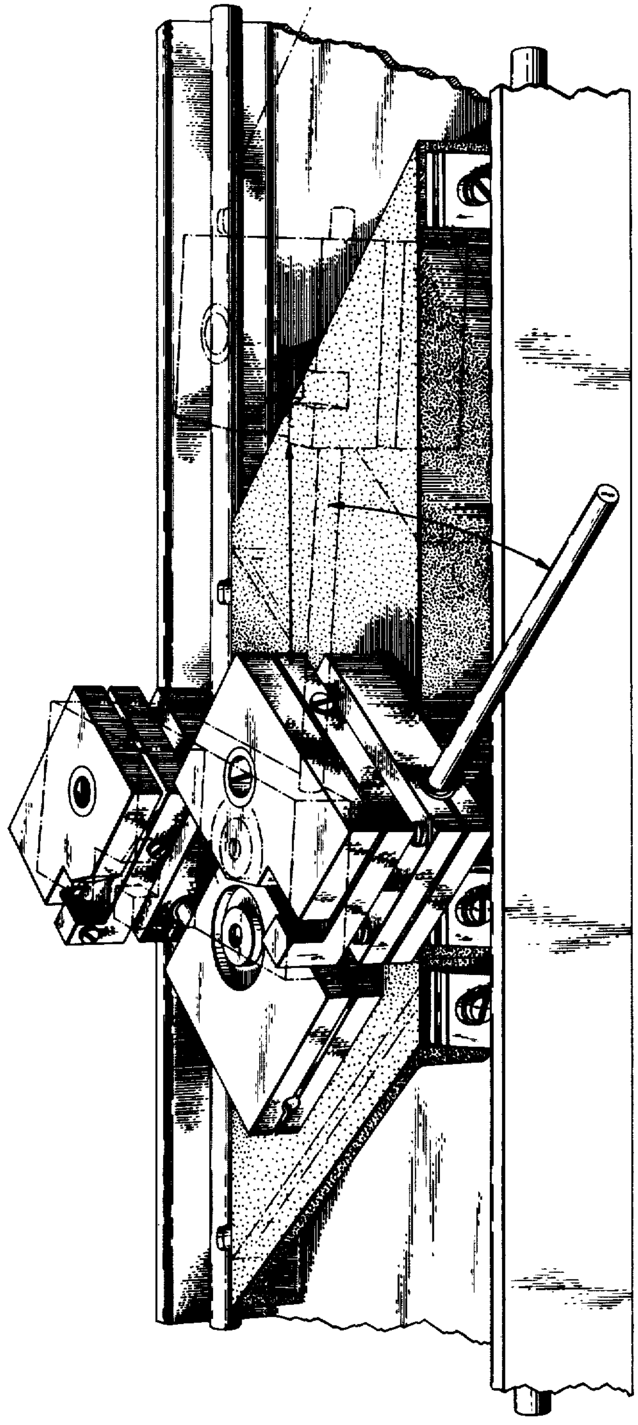

Although the embodiment of FIG. 5 shows the second and third rotary members pivoting about axes which are placed directly over the linear members along which they are capable of moving, this need not be the case. For example, FIGS. 6 and 7 show an embodiment wherein the second and third rotary members (621, 631) are supported by rails (650, 651) at the upper and lower edges of the assembly. This also provides for motion of the second and third rotary members along parallel linear axes (624, 634), and any assembly which provides for such motion is included herein. The embodiment of FIGS. 6 and 7 does not make use of air bearings, and can be used for situations wherein the device is placed inside a vacuum.

Figure 8:
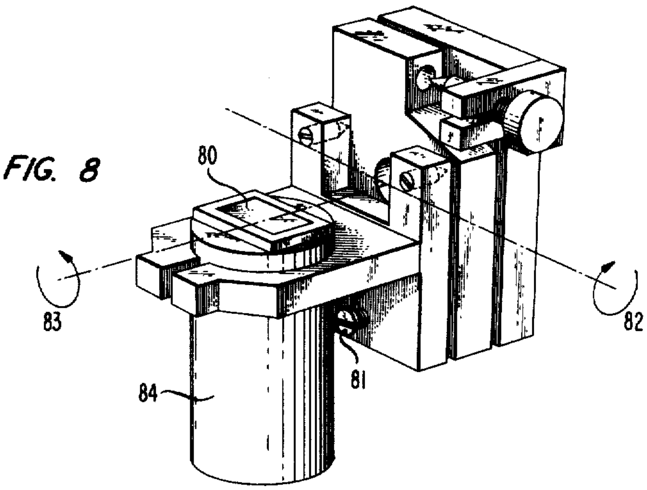
FIG. 8 shows a corrector assembly for obtaining more precise positioning of a member.

When the device is to be used as an X-ray monochromator employing Bragg angle reflection, it is typically necessary to provide for a corrector assembly mounted on the rotary members to provide for fine adjustment of the crystals. Corrector assemblies can be provided for one or both of the first and second crystals in a dual crystal monochromator; a typical corrector is shown in FIG. 8. The first job of the corrector is to allow the normal to the diffracting crystals planes to be made parallel to the linear sliding bars. Crystals can typically be cut and polished accurately to the order of a few tenths of a degree, and thus the anticipated correction capability should be of this amount. Due to the small angular emittance of a synchrotron radiation source, the alignment of the crystals through the axis 83 perpendicular to the plane of the FIGS. 1-6 (the $\theta$ correction) is the most critical adjustment. The second adjustment is a tilt 82 that rotates the crystal normal in and out of the plane of FIGS. 1-6. Since the required angular adjustment range is minimal, Bendix flex pivots (tortion bearings) have been used for the bearings supplying the $\theta$ correction. The angle is adjusted by a differential micrometer screw (Klinger Model 385-034) on a tangent arm of 3 centimeters. These micrometers can be controlled by DC motors and yield an angular range of approximately 1 degree. In series with this is a fine electronically controlled motion driven by a PZT piezoelectric adjuster 84 (Burleigh PZT40) capable of 120 arcseconds of angular control. The crystals mount directly on the PZT pusher in interchangeable mounts. The second angular degree of freedom in the corrector is controlled by thumb screw adjustments on ball kinematic mounts.

Figure 9:
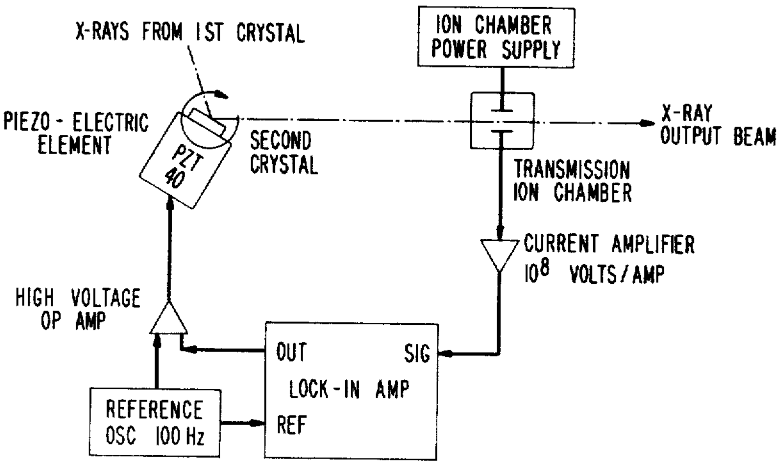
FIG. 9 shows electronic feedback means for fine-tuning of the angle of the second crystal.

An electronic feedback system is utilized to control the mechanical piezoelectric controller, with a block diagram being shown in FIG. 9. A high voltage operational amplifier capable of 0 to 1,000 volt output at high slew rate and having programmability (Burleigh PZ90) directly drives the piezoelectric element. This drive signal contains a DC bias (0 to 1,000 volts) that sets the mean angle of the second crystal, and a modulation signal at 100 Hz and approximately 0.1 to 1 volts peak-to-peak amplitude is also applied to the element, which results in a small AC component in the X-ray output signal. The output beam passes through a transmission ionization chamber, which produces a signal proportional to the intensity of the output beam. This signal is amplified by a (Keithy 427) current amplifier with a gain in the neighborhood of $10^8$ volts per amp and a frequency response commensurate with the AC probe content of the signal. The voltage output from this stage drives a (P.A.R. Model 124) lock-in amplifier. This lock-in amplifier is referenced to a sine wave oscillator at 100 Hz (Hp Model 3310B) that also provides the angle modulation signal to the high voltage operational amplifier previously described. The phase sensitive DC output of the lock-in amplifier then directly drives the operational amplifier input to adjust the mean angle for minimum 100 Hz content in the output X-ray beam. That is, the feedback stabilized system stays at the point of zero first derivatives on the top of the double crystal reflection intensity curve. It is also possible to adjust a feedback system of this type to operate on the side of the reflection curve, that is, at a reduced intensity, for improved harmonic suppression.

For many uses, the device can be operated without the need of the above-noted corrector assembly. However, for use as a dual crystal X-ray monochromator, an initial and final alignment is desired. Convenient Bragg angle reflecting crystals can be silicon, using the 220 reflecting planes approximately parallel to the surface. A typical surface area is 4 square centimeters, and a typical crystal thickness is 5 millimeters, with the surface being Syton-polished to provide an optical mirror surface. A preliminary alignment is performed with a helium-neon laser simulating a synchrotron beam. At an arbitrary position of the monochromator, the $\theta$ motion on the first crystal corrector is adjusted so that the reflected light impinges the second crystal at its center. The laser is then directed to enter the monochromator from the exit beam side, and the $\theta$ correction is then adjusted to make the reflected beam strike the first crystal at its center. The tilt controls are also set so that the crystals are approximately parallel. This final alignment allows the monochromator to be tuned without the feedback network over the entire wavelength range with the laser beam direction changing less than about 30 arcseconds.

In addition, for use as a dual crystal X-ray monochromator, it is additionally desirable to do an alignment with an X-ray source. This is necessary because the crystal X-ray reflecting planes and the polished crystal surface are not exactly parallel. The X-ray alignment may be accomplished by first reflecting an X-ray beam at arbitrary energy from the first crystal and photographically recording its position on the second crystal. The first crystal corrector is then adjusted to position the reflected beam at the center of the second crystal. A detector (sodium iodide scintillator) and phototube are then placed at the monochromator output slit, and second crystal corrector $\theta$ motion is scanned for the second reflection. After finding this reflection, a transmission ion chamber replaces the scintillator and is connected to the feedback arrangement shown in FIG. 9.

One feature of the device is that when used as a Bragg crystal X-ray monochromator, the energy of the output beam, which is proportional to the inverse of the wavelength selected, is directly proportional to the distance between the second and third rotary members in the embodiment of FIGS. 1 and 2. In the embodiment in FIGS. 3 and 4, the relevant distance is between the first and third rotary member. Therefore, by measuring this distance, the output energy can be directly determined. Various distance measuring devices, including optical devices, resistance devices, capacitive devices, or mechanical gear devices, may be used for this purpose. In some cases, however, it is more convenient to measure a distance along one of the linear axes, typically the second linear axes, along which the second rotary member moves in the embodiment of FIG. 1. A calibration formula can be used to convert the linear position to X-ray energy in keV based on the formula:

$$Ed_{hkl} = \frac{6.19}{\sin(\frac{1}{2}\tan^{-1}D/X)}$$

Here, E is the beam energy in keV, $d_{hkl}$ is the Miller plane spacing in Angstroms for the diffracting crystals, D is the offset in beam height designed into the monochromator, and X is the linear position readout of the second crystal. The origin for X is the position where the second crystal lies directly below the first crystal.

There are several possible ways of implementing the design of the tunable wavelength selective device. A more compact instrument results by diminishing the value of D. Higher energies corresponding to shorter reflected wavelengths are achieved by extending the right angle bar that passes through the second crystal, in the case of a dual crystal monochromator, and either extending or moving the second crystal horizontal slide further out. For many X-ray experiments, control over harmonic content in the output beam is important. Several methods are available to reduce harmonics. Total external reflection X-ray mirrors can be conveniently used either before or after the monochromator, with the incidence angles chosen so the harmonic beams lie above their critical angles. The absence of output beam height variation with energy allows the possibility of having such harmonic suppression capability downstream at the experiments. On the other hand, the piezoelectric feedback system previously described can be modified to stabilize on the side of a rocking curve where harmonic content is reduced. This can be accomplished by stabilizing on second derivative signals at twice the piezo-driving frequency. When an absorption or scattering in the monochromator presents a problem in a normal air atmosphere, the system may be placed in a closed environment, and the air bearings driven by compressed helium. For operation at very low energies, the monochromator is operated in a vacuum environment, typically with the embodiment shown in FIGS. 6 and 7.

As noted above, various wavelength selective devices may be utilized on at least one of the rotary members, with either another wavelength selective device or a different type device located on the second rotary member. Various portions of the electromagnetic spectrum may be utilized for a tunable wavelength selective device of this type, including in addition to optical and X-ray, the infrared, ultraviolet, etc. Furthermore, particulate radiation may also have energies selected by wavelength selective members that operate on the wavelength associated with the energy of the particle. Although $\theta-2\theta$ devices typically operate with at least one wavelength selective member, other uses do not require selectivity. For example, the path length between the input and output is changed by tuning the device, so that a variable delay optical device can be obtained. For this purpose, two reflective non-wavelength selective surfaces (e.g., mirrors) can be used. For other types of electromagnetic radiation, or various types of particulate radiation, other directive means may be used to direct the radiation incident on the first member onto the second member. Finally, if additional wavelength selectivity or other characteristics are desired, additional wavelength selective members, or other members, may be provided by replicating the basic structure. That is, the output beam may be directed to the input of a second tunable device. By inverting the structure of the second (or subsequent) device, the same axes may be used as for the first device. All such variations and deviations which rely on the basic teachings through which the present invention has advanced the art are considered to be within the spirit and scope of the present invention.

What is claimed is:

1. A device comprising a first rotary member which directs at least a portion of an intercepted input beam of radiation so as to intercept a second rotary member, CHARACTERIZED IN THAT said first and second rotary members are connected to a third rotary member by first and second sliding linear members, respectively, with said linear members located at right angles to one another, and with one of said rotary members capable of rotation about a fixable pivot point, and with the other two of said rotary members capable of rotation about pivot points which are capable of motion only along second and third parallel linear axes, respectively, and with said fixable pivot point being located so that a first axis drawn through said fixable pivot point and parallel to said second and third axes thereby forms three equally spaced axes.

2. The device of claim 1 FURTHER CHARACTERIZED IN THAT at least one of said first and second rotary member comprises a wavelength selective member wherein the wavelength selected is a function of the angle at which said radiation intercepts a surface of said member.

3. The device of claim 2 FURTHER CHARACTERIZED IN THAT said wavelength selective member is selected from the group consisting of Bragg crystal, diffraction grating, and prism.

4. The device of claim 2 FURTHER CHARACTERIZED IN THAT said device comprises distance measuring means to determine the distance between two of said rotary members, whereby a distance proportional to the energy of said selected wavelength is obtained.

5. The device of claim 1 FURTHER CHARACTERIZED IN THAT each of said first and second rotary members comprise the surface of a crystal which produces Bragg reflection of incident X-ray radiation according to the lattice spacing of said crystal.

6. The device of claim 5 FURTHER CHARACTERIZED IN THAT said crystal surface of said first rotary member is substantially parallel to said crystal surface of said second rotary member.

7. The device of claim 1 FURTHER CHARACTERIZED IN THAT one of said first and second rotary members comprises a wavelength selective member, and the other of said first and second rotary members comprises a polarizer.

8. The device of claim 1 FURTHER CHARACTERIZED IN THAT said device comprises intensity determining means for determining the intensity of radiation reflected from said second rotary member, and angle control means for controlling the angle of said second rotary member relative to the radiation intercepted by said member, and feedback means, whereby information from said intensity determining means is applied to said angle control means so as to maintain said reflected beam at a desired intensity.

9. The device of claim 1 FURTHER CHARACTERIZED in that said fixable pivot point is at a fixed point.

10. The device of claim 1 FURTHER CHARACTERIZED in that said fixable pivot point is capable of motion only along said first axis.

11. The device of claims 1, 2, 3, 4, 5, 6, 7, 8, 9, or 10 FURTHER CHARACTERIZED in that said second rotary member is arranged to direct an output beam of said irradiation substantially parallel or antiparallel to said input beam when said input beam is substantially parallel to said liner axes, so that the offset distance between said beams remains substantially constant as the rotary members are moved along said second and third parallel linear axes.

* * * * *